(12) United States Patent
Cheng et al.

(10) Patent No.: US 6,712,869 B2
(45) Date of Patent: Mar. 30, 2004

(54) EXHAUST AFTERTREATMENT DEVICE WITH FLOW DIFFUSER

(75) Inventors: C. Raymond Cheng, Madison, WI (US); Z. Gerald Liu, Madison, IN (US); Randolph G. Zoran, McFarland, WI (US)

(73) Assignee: Fleetguard, Inc., Nashville, TN (US)

( * ) Notice: Subject to any disclaimer, the term of this patent is extended or adjusted under 35 U.S.C. 154(b) by 33 days.

(21) Appl. No.: 10/083,954

(22) Filed: Feb. 27, 2002

(65) Prior Publication Data

US 2003/0159414 A1 Aug. 28, 2003

(51) Int. Cl.[7] .............................. B01D 53/92; F01N 3/28
(52) U.S. Cl. .............................. 55/418; 55/457; 55/476; 55/DIG. 30; 422/176; 60/324
(58) Field of Search .......................... 55/418, 434, 476, 55/447, 457, DIG. 30; 60/272, 282, 299, 311, 324; 422/176

(56) References Cited

U.S. PATENT DOCUMENTS

| | | |
|---|---|---|
| 3,380,810 A | 4/1968 | Hamblin |
| 3,645,093 A | 2/1972 | Thomas |
| 3,754,398 A | 8/1973 | Mattavi |
| 3,852,042 A * | 12/1974 | Wagner ............... 422/176 |
| 3,964,875 A * | 6/1976 | Chang et al. ......... 422/176 |
| 4,017,347 A | 4/1977 | Cleveland |
| 4,054,418 A | 10/1977 | Miller et al. |
| 4,297,116 A | 10/1981 | Cusick |
| 4,538,413 A | 9/1985 | Shinzawa et al. |
| 4,652,286 A | 3/1987 | Kusuda et al. |
| 4,730,454 A | 3/1988 | Pischinger et al. |
| 4,732,743 A | 3/1988 | Schmidt et al. |
| 4,854,123 A | 8/1989 | Inoue |
| 4,866,932 A | 9/1989 | Morita et al. |
| 4,902,309 A | 2/1990 | Hempenstall |

(List continued on next page.)

FOREIGN PATENT DOCUMENTS

| | | |
|---|---|---|
| DE | 4417238 | 9/1994 |
| GB | 2 383 548 | 7/2003 |

OTHER PUBLICATIONS

WPI Abstract AN 1991–076030 [18] & JP 3021313 A (Matsushita).
WPI Abstract AN 1986–012802[02] & SU 1163889A (Zajtsev et al.).

*Primary Examiner*—Frank M. Lawrence
(74) *Attorney, Agent, or Firm*—Andrus, Sceales, Starke & Sawall, LLP

(57) ABSTRACT

An exhaust aftertreatment device has a diffuser upstream of an aftertreatment element such as a catalyst element or a filter element such as a diesel particulate filter. The diffuser de-focuses centralized velocity force flow against the aftertreatment element from the inlet in a space efficient and flow efficient construction.

5 Claims, 5 Drawing Sheets

U.S. PATENT DOCUMENTS

| | | | |
|---|---|---|---|
| 5,021,227 A | | 6/1991 | Kobayashi et al. |
| 5,053,062 A | | 10/1991 | Barris et al. |
| 5,082,478 A | | 1/1992 | Oono et al. |
| 5,110,560 A | * | 5/1992 | Presz et al. .................. 422/176 |
| 5,171,341 A | | 12/1992 | Merry |
| 5,209,062 A | | 5/1993 | Vollenweider |
| 5,322,537 A | | 6/1994 | Nakamura et al. |
| 5,339,630 A | | 8/1994 | Pettit |
| 5,408,828 A | * | 4/1995 | Kreucher et al. ............. 60/299 |
| 5,453,116 A | | 9/1995 | Fischer et al. |
| 5,457,945 A | | 10/1995 | Adiletta |
| 5,484,575 A | * | 1/1996 | Steenackers ................ 422/176 |
| 5,584,178 A | | 12/1996 | Naegeli et al. |
| 5,611,832 A | | 3/1997 | Suzuki et al. |
| 5,643,536 A | | 7/1997 | Schmelz |
| 5,720,787 A | | 2/1998 | Kasai et al. |
| 5,771,689 A | | 6/1998 | Bareis et al. |
| 5,828,013 A | * | 10/1998 | Wagner et al. .............. 181/255 |
| 5,908,480 A | | 6/1999 | Ban et al. |
| 5,916,134 A | * | 6/1999 | Yang et al. ................... 60/299 |
| 5,992,141 A | | 11/1999 | Berriman et al. |
| 6,003,305 A | | 12/1999 | Martin et al. |
| 6,041,594 A | | 3/2000 | Brenner et al. |
| 6,050,088 A | | 4/2000 | Brenner |
| 2002/0040826 A1 | | 4/2002 | Wagner et al. |
| 2002/0073698 A1 | * | 6/2002 | D'Herde et al. .............. 60/324 |
| 2002/0162319 A1 | * | 11/2002 | Crocker et al. ............... 60/274 |

\* cited by examiner

EXHAUST AFTERTREATMENT DEVICE WITH FLOW DIFFUSER

BACKGROUND AND SUMMARY OF THE INVENTION

The invention relates to exhaust aftertreatment devices, including diesel particulate filter elements and/or catalyst elements, and more particularly to a device evening out the exhaust flow profile across such element.

Exhaust aftertreatment elements typically include an extruded substrate or a spiral wound corrugated or pleated sheet having a plurality of flow channels which may be catalytically treated to provide a flow-through catalytic element and/or which may be alternately plugged at opposite axial ends of the channels to provide a wall-flow filter element. The housing for the element has an upstream inlet for receiving exhaust, and a downstream outlet for discharging the exhaust. The inlet typically has a smaller diameter than the diameter of the housing and aftertreatment element, and exhaust gas entering the housing at the inlet impinges directly at the center of the element, which may cause push-out damage due to concentrated high velocity exhaust gas impinging on the center portion of the catalyst or filter element. The impact force generated from the exhaust flow can often be strong enough to sheer the layers within the spiral wound media and push them out towards the downstream end along the axial centerline.

The present invention addresses and solves the above noted push-out problem with a flow diffuser which de-focuses centralized velocity force flow against the aftertreatment element from the inlet and evens out the exhaust flow profile across such element. In one embodiment, the invention enables more efficient space utilization for contaminant reduction, capture and holding, and also reduces pressure drop. In another embodiment, the invention facilitates cost and manufacturing advantage.

DETAILED DESCRIPTION

Figure 1:
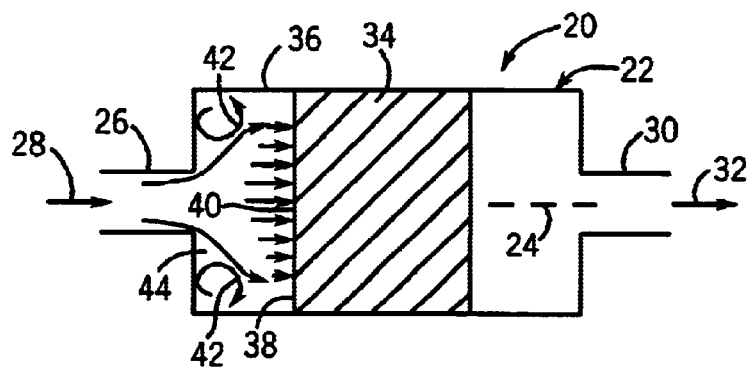
FIG. 1 is a schematic sectional view of an exhaust aftertreatment device known in the prior art.

FIG. 1 shows an exhaust aftertreatment device 20 including a housing 22 extending axially along an axis 24 and having an upstream inlet 26 for receiving exhaust as shown at arrow 28, and having a downstream outlet 30 for discharging the exhaust as shown at arrow 32. Confined within the housing is an aftertreatment element 34, which may be a flow-through catalyst element catalytically reacting with the exhaust gas and/or a wall-flow filter element such as a diesel particulate filter for trapping contaminant such as soot. Such elements are typically provided by a flat base layer or sheet having a corrugated or pleated sheet thereon, which sheets are wound in a spiral to provide a cylindrical element, as is known, for example U.S. Pat. Nos. 4,017,347, 4,652,286, 5,322,537, 5,908,480, incorporated herein by reference. Inlet 26 has a smaller diameter than outer housing sidewall 36. Exhaust gas from inlet 26 directly impinges the upstream axial end 38 of element 34 at the central area 40 thereof. Flow recirculation occurs as shown at arrows 42 near the inlet 26, and also near the outlet 30, due to sudden expansion and sudden contraction. The impact force generated from the exhaust flow against central area 40 can often be strong enough to sheer the layers within the spiral wound media of element 34 and push them out from the center, i.e. rightwardly in FIG. 1. A more even distribution of the flow pattern is desired in entrance chamber 44 of the housing.

Figure 2:
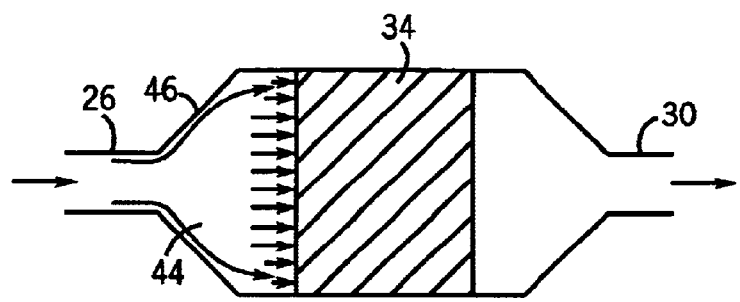
FIG. 2 is a schematic sectional view of another embodiment of an exhaust aftertreatment device known in the prior art.

FIG. 2 uses like reference numerals from above where appropriate to facilitate understanding. As illustrated in FIG. 2, it is known in the prior art to provide a more even distribution of exhaust gas flow in entrance chamber 44 by providing tapered walls 46. This provides a transition duct expanding to larger cross-sectional areas as the tapered wall 46 extends from inlet 26 toward aftertreatment element 34.

Figure 3:
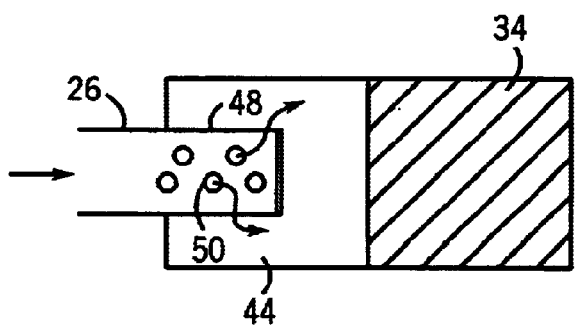
FIG. 3 is a schematic sectional view of another embodiment of an exhaust aftertreatment device known in the prior art.

FIG. 3 uses like reference numerals from above where appropriate to facilitate understanding. It is also known in the prior art to use an inlet tube 48 which is perforated as shown at 50 to provide improved flow distribution.

Figure 4:
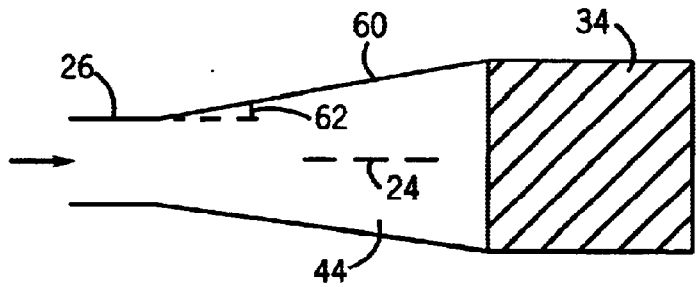
FIG. 4 is a schematic sectional view of an exhaust aftertreatment device in accordance with the present invention.

FIG. 4 uses like reference numerals above where appropriate to facilitate understanding. In one embodiment of the present invention, a diffuser is provided by a tapered wall 60 extending from inlet 26 toward aftertreatment element 34 at a reduced angle relative to axis 24 found to provide enhanced performance, to be described. In the preferred embodiment, angle 62 is less than about 25°, and preferably about 20°. It has been found that not all tapering as at 46, FIG. 2, provides improved flow distribution.

Figure 5:
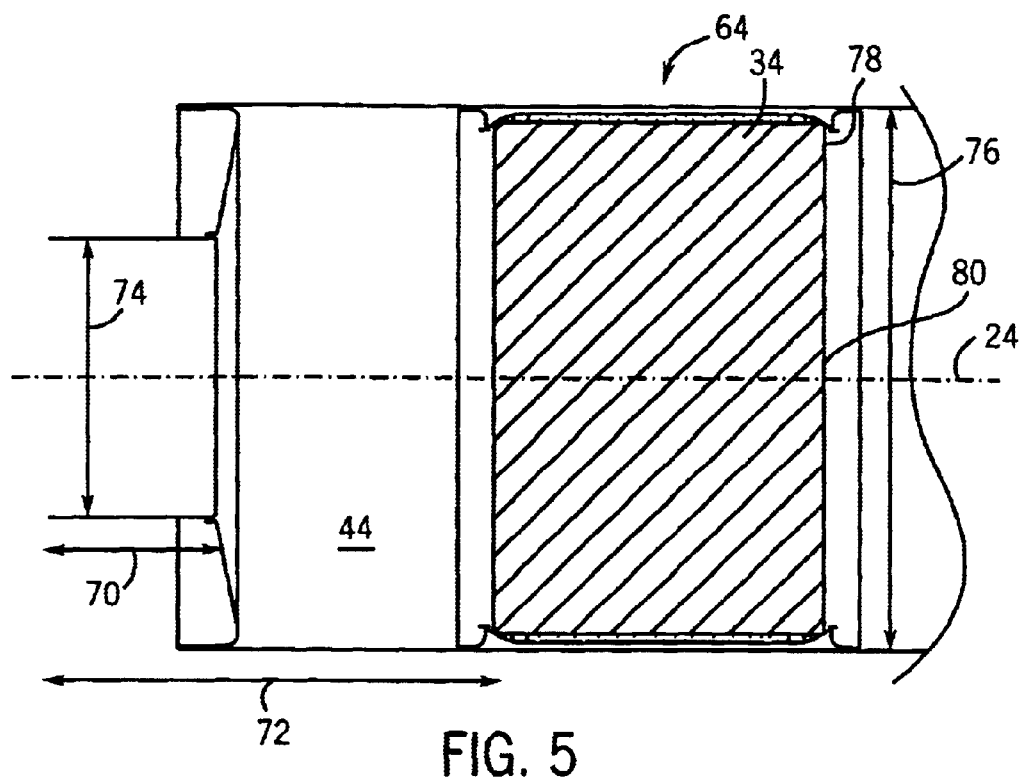
FIG. 5 is a schematic sectional view of a tested exhaust aftertreatment device.
Figure 6:
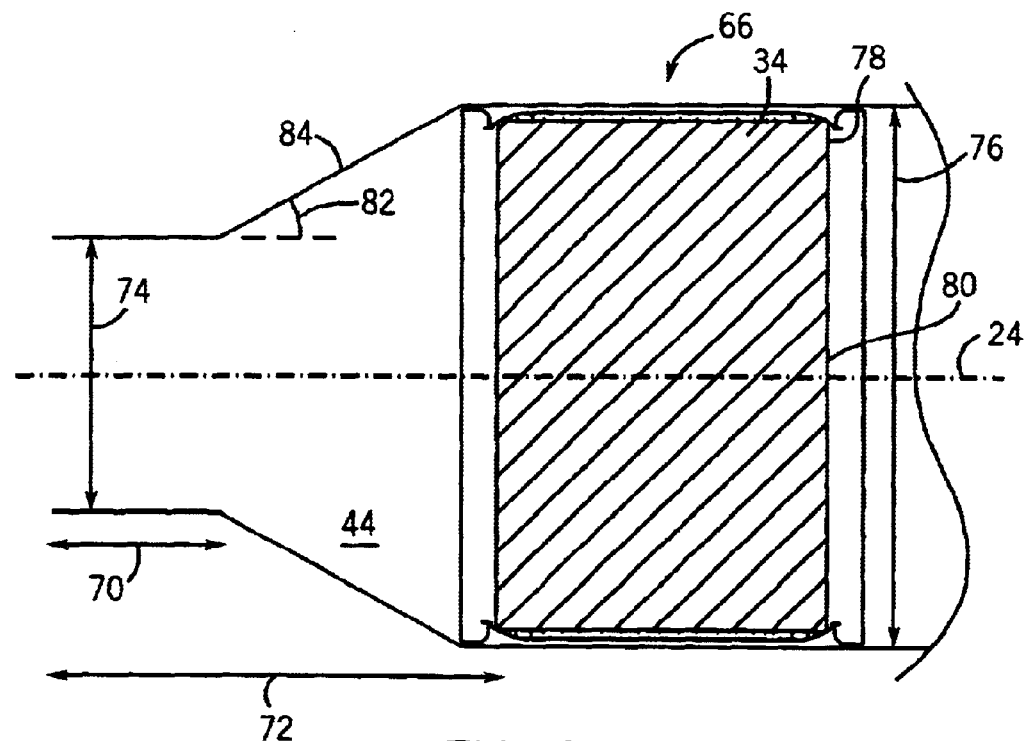
FIG. 6 is a schematic sectional view of another tested exhaust aftertreatment device.
Figure 7:
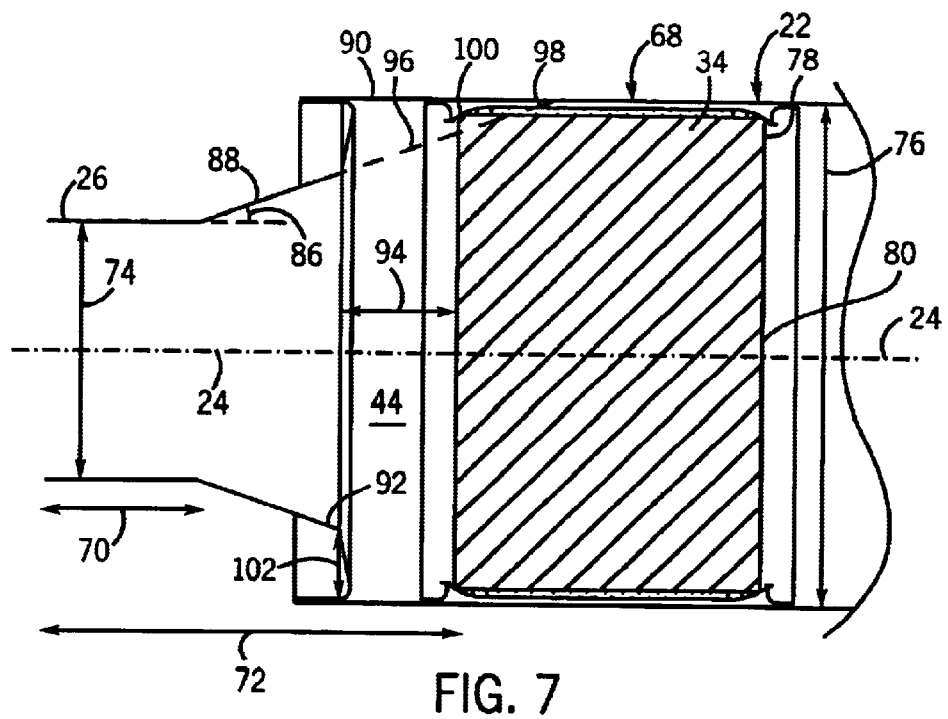
FIG. 7 is a schematic sectional view of another tested exhaust aftertreatment device.
Figure 8:
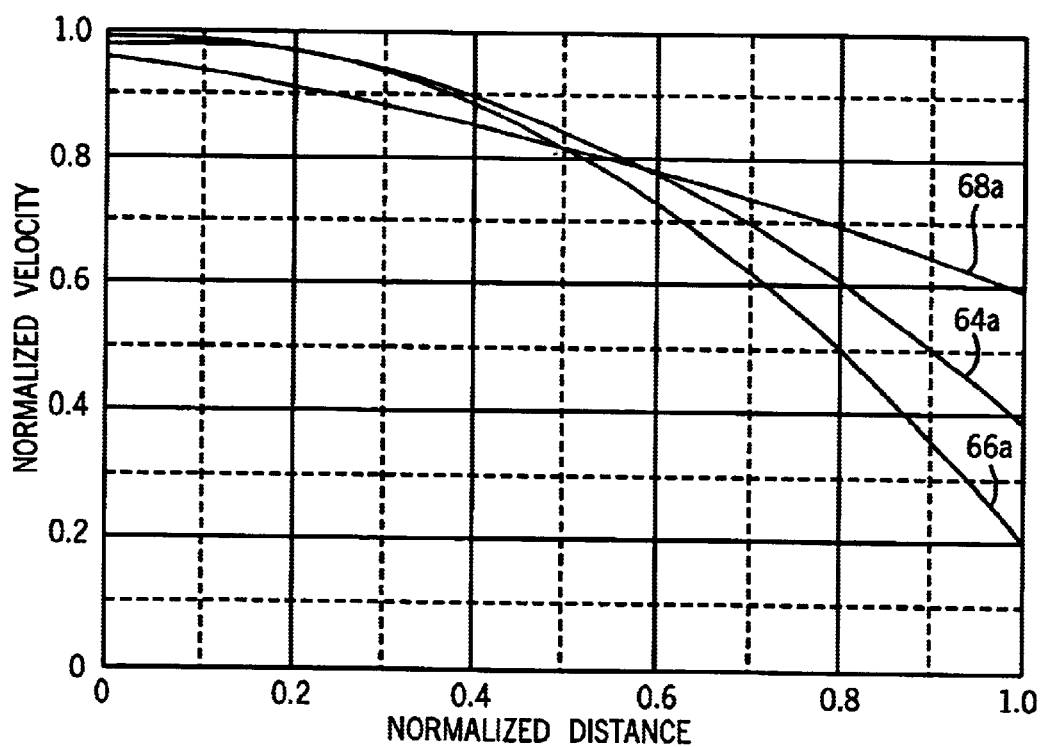
FIG. 8 is a graph showing the test results for the devices of FIGS. 5–7.

FIGS. 5–7 use like reference numerals from above where appropriate to facilitate understanding. FIG. 5 illustrates a tested device 64 comparable to that shown in FIG. 1. FIG. 6 illustrates a tested device 66 comparable to that shown in FIG. 2. FIG. 7 illustrates a tested device 68 providing improved performance in accordance with the invention. For uniformity of comparison, the following are the noted dimensions in FIGS. 5–7: axial dimension 70 is three inches; axial dimension 72 is eight inches; lateral dimension 74 is five inches; lateral dimension 76 is ten inches. FIG. 8 graphically illustrates the test results. The abscissa along the horizontal x-axis is the normalized lateral distance from the center of the element. For example, the normalized distance 1.0 is at the laterally outward edge at 78 of element 34 approximately four and five-eighths inches from the center of the element at 80. The ordinate along the vertical y-axis is normalized velocity, wherein the normalized velocity 1.0 is 2,300 feet per minute. The graph the plots flow velocity versus lateral distance from the center of the element. Curve 64a represents the data for device 64 of FIG. 5. Curve 66a represents the data for device 66 of FIG. 6. Curve 68a represents the data for device 68 of FIG. 7. In FIG. 6, the taper angle 82 of tapered wall 84 relative to axis 24 is 30°. In FIG. 7, the taper angle 86 of tapered wall 88 relative to axis 24 is 20°. As shown in FIG. 8, the greatest variation in velocity of exhaust gas flow is provided by device 66, wherein the velocity drops to 0.2 at the maximum laterally outward distance 1.0. The velocity thus decreases from its maximum of 1.0 at the center 80 of the element to a minimum of 0.2 at laterally outward portion 78. For device 64, as shown at curve 64a, the velocity at outer edge 78 is 0.4, a difference of 0.6 from its maximum velocity of 1.0 at center 80. For device 68, as shown at curve 68a, the velocity at outer edge 78 is 0.6, a difference of 0.4 from its maximum velocity of 1.0 at center 80. The flattest curve in FIG. 8 and the one which provides the least variation in velocity is curve 68a, i.e. the smallest velocity differential from the center of the element 80 to the outer edge 78 is 0.4 as provided by curve 68a. The flatter the curve, the more uniform the flow distribution laterally across element 34. It is noted that tapered wall 84 at 30°, angle 82 in FIG. 6, actually provides worse flow distribution than device 64, which is the opposite of what would be expected.

In the preferred embodiment of device 68 in FIG. 7, tapered wall 88 provides a diffuser in housing 22 at inlet 26 de-focusing centralized velocity force flow against element 34 from inlet 26, as illustrated by curve 68a in FIG. 8. In FIG. 7, housing 22 has an axially extending outer wall 90 confining element 34 therein. Tapered wall 88 extends from inlet 26 towards aftertreatment element 34 and defines a transition duct expanding to larger cross-sectional areas as tapered wall 88 extends from inlet 26 towards element 34. Tapered wall 88 has a downstream end 92 spaced laterally inwardly from outer wall 90 and spaced axially upstream from element 34 by an axial gap 94 therebetween. A projection line, as shown as dashed line 96 drawn along tapered wall 88 and extended therebeyond intersects outer wall 90 at element 34 as shown at 98. Projection line 96 and tapered wall 88 extend at a 20° angle 86 relative to axis 24. It is preferred that angle 86 be no greater than about 25°. At a 25° angle 86, projection line 96 would intersect outer wall 90 at the upstream outer edge 100 of element 34. The ratio of the length of axial gap 94 to the length of the lateral spacing 102 between outer wall 90 and downstream end 92 of tapered wall 88 is about 1.5, and preferably less than 2.

A drawback of the small taper or cone angle 62 of FIG. 4 is the extended axial length required to accommodate same. For exhaust systems where such extra space is not available, the structure of device 68 of FIG. 7 offers one solution.

Figure 9:
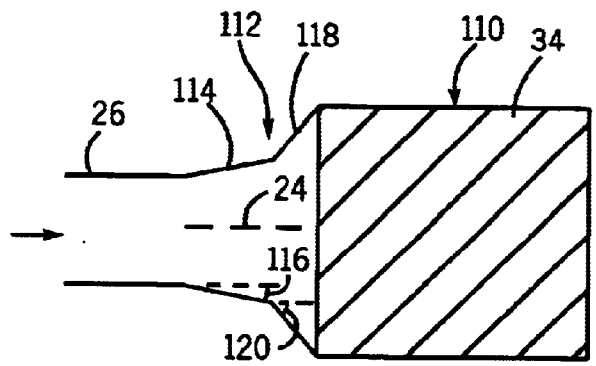
FIG. 9 is a schematic sectional view of another embodiment of an exhaust aftertreatment device in accordance with the invention.

FIG. 9 uses like reference numerals from above to facilitate understanding. Device 110 in FIG. 9 provides another solution to the noted problem where the small taper angle 62 of FIG. 4 is desired, but there is not enough axial extension room in the exhaust system to accommodate same. In FIG. 9, a diffuser is provided by a tapered wall 112 extending from inlet 26 towards element 34 and defining a transition duct expanding to larger cross-sectional areas as tapered wall 112 extends from inlet 26 towards element 34. Wall 112 tapers at a compound angle defined by a first section 114 extending from inlet 26 at a first angle 116 relative to axis 24, and a second section 118 extending from section 114 at a second angle 120 relative to axis 24. Angle 120 is greater than angle 116. In the preferred embodiment, angle 116 is less than about 25°, and angle 120 may be greater than 30°.

Figure 10:
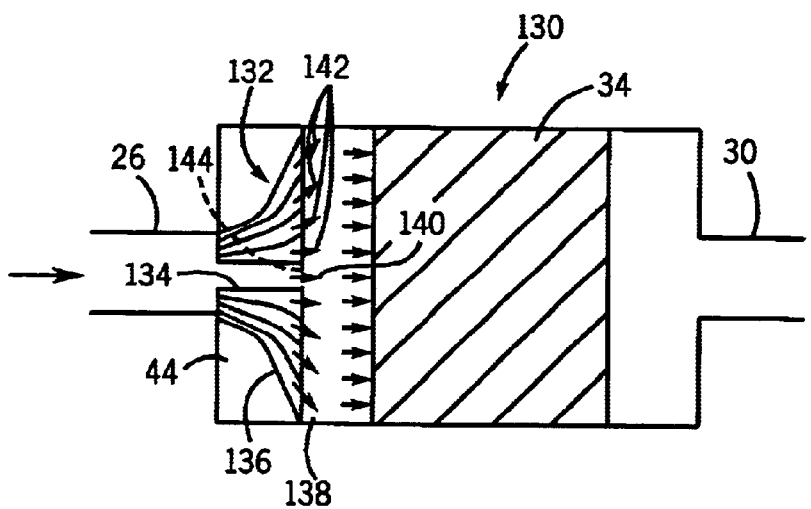
FIG. 10 is a schematic sectional view of another embodiment of an exhaust aftertreatment device in accordance with the invention.

FIG. 10 uses like reference numerals from above where appropriate to facilitate understanding. FIG. 10 shows a device 130 having a diffuser 132 which may be used in addition to or in place of the above described diffusers. Diffuser 132 includes a central axially extending cylindrical tube 134 having a plurality of vanes 136 extending radially outwardly from tube 134 and curved to impart a non-axial flow direction component to the exhaust flow as shown at arrow 138. A first portion 140 of the exhaust flows from inlet 26 within tube 134, and a second portion 142 of the exhaust flows from inlet 26 along vanes 136 and is directed by the curving of the vanes along the non-axial flow component direction 138. Second portion 142 of the exhaust flow is an annulus concentrically surrounding first portion 140 of the exhaust flow. First portion 140 of the exhaust flows from inlet 26 axially through tube 134 to aftertreatment element 34. Tube 134 is preferably perforated at downstream axial end 144, and may also be perforated along its cylindrical sidewall.

Figure 11:
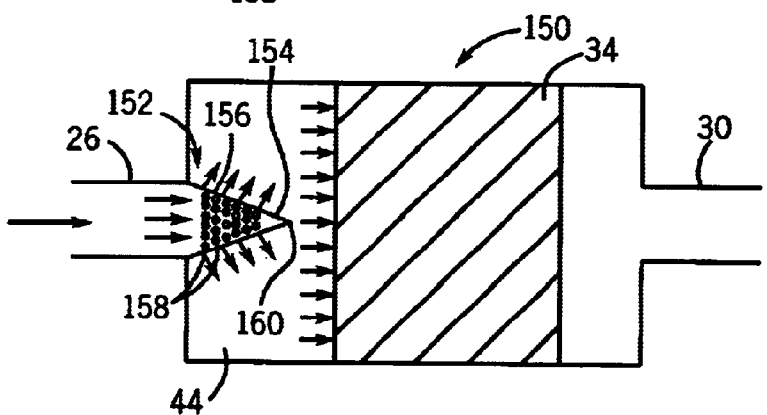
FIG. 11 is a schematic sectional view of another embodiment of an exhaust aftertreatment device in accordance with the invention.

FIG. 11 uses like reference numerals from above where appropriate to facilitate understanding. Device 150 in FIG. 11 includes a diffuser 152 which may be used in addition to or in place of the above noted diffusers. Diffuser 152 is a conically shaped perforated tube 154 at inlet 26 and has a tapered sidewall 156 with uniform porosity as shown at perforations 158. The conically shaped tube converges at an apex 160 pointing axially downstream toward aftertreatment element 34. Because the diameter of tube 154 decreases along the axial flow direction, it forces the exhaust gas to pass through the perforations, and the resulting flow through the perforations is more uniform.

Figure 12:
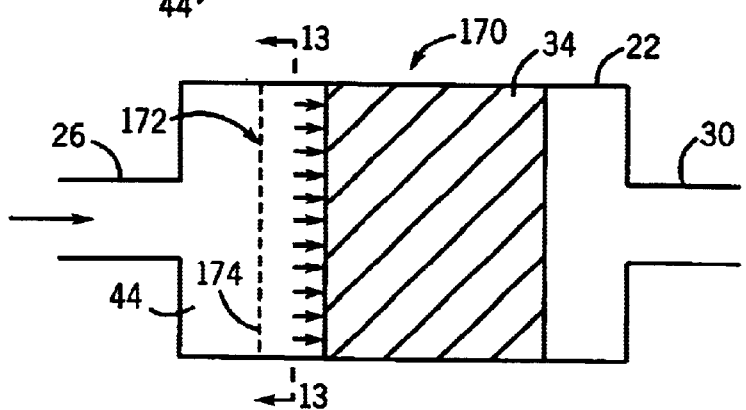
FIG. 12 is a schematic sectional view of another embodiment of an exhaust aftertreatment device in accordance with the invention.
Figure 13:
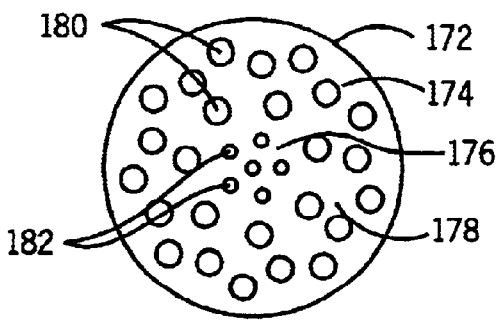
FIG. 13 is a sectional view taken along line 13—13 of FIG. 12.

FIG. 12 uses like reference numerals from above where appropriate to facilitate understanding. Device 170 in FIG. 12 includes a diffuser 172 which may be used in addition to or in place of the above noted diffusers. Diffuser 172 is a perforated plate 174 having varied perforation porosity, FIG. 13. Housing 22 has the noted chamber 44 between inlet 26 and aftertreatment element 34. Plate 174 extends laterally across chamber 44 and has a first central area 176 and a second surrounding area 178. Second area 178 has a higher perforation porosity than first area 176. For example, second surrounding area 178 has larger perforated holes 180 than the perforated holes 182 of central area 176. This varied or differential perforation porosity de-focuses the centralized velocity force flow against aftertreatment element 34 from inlet 26, and instead provides a more distributed and even flow pattern. Perforation porosity may also or alternatively be varied by spacing, patterns, and density of the noted perforations, in addition to the noted different sizes of perforations.

Figure 14:
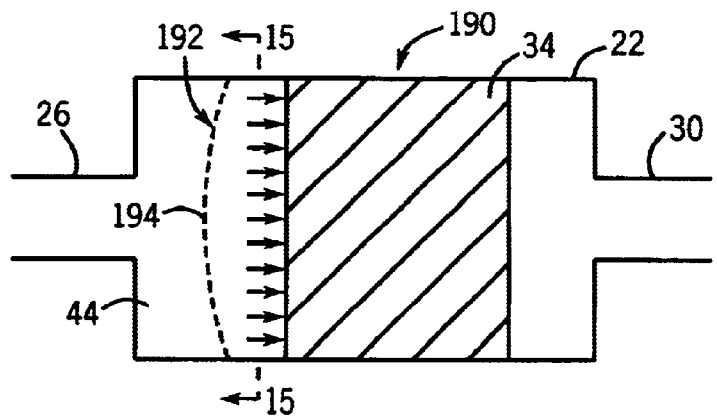
FIG. 14 is a schematic sectional view of another embodiment of an exhaust aftertreatment device in accordance with the invention.
Figure 15:
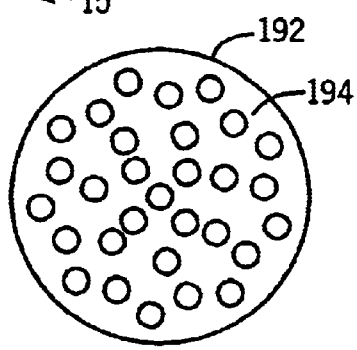
FIG. 15 is a sectional view taken along line 15—15 of FIG. 14.

FIG. 14 uses like reference numerals from above where appropriate to facilitate understanding. Device 190 in FIG. 14 has a diffuser 192 which may be used in addition to or in place of the above noted diffusers. Diffuser 192 is a crowned perforated plate 194 between inlet 26 and aftertreatment element 34. Housing 22 has the noted chamber 44 between inlet 26 and element 34. Plate 194 extends laterally across chamber 44 and is crowned convexly toward inlet 26, i.e. leftwardly in FIG. 14. In one form, plate 194 has uniform perforation porosity, FIG. 15, though in other embodiments may have varied perforation porosity.

Figure 16:
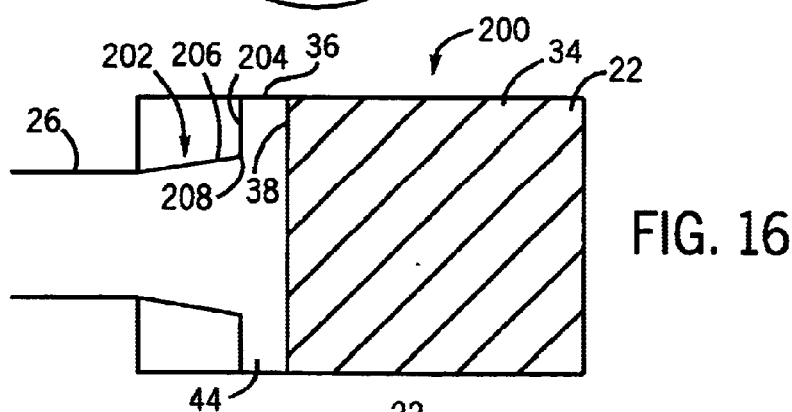
FIG. 16 is a schematic sectional view of another embodiment of an exhaust aftertreatment device in accordance with the invention.

FIG. 16 uses like reference numerals from above where appropriate to facilitate understanding. Device 200 in FIG. 16 has a housing 22 with a wall 36 defining the noted chamber 44 between inlet 26 and aftertreatment element 34. A diffuser 202 is provided in chamber 44 and spaced laterally inwardly from housing wall 36. Diffuser 202 extends from inlet 26 toward element 34. A support flange 204 in chamber 44 is axially spaced between inlet 26 and element 34 and extends laterally inwardly from housing wall 36 to diffuser 202 to support the latter. Diffuser 202 is a tapered wall 206 spaced laterally inwardly of housing wall 36 and extending from inlet 26 towards element 34 and defining a transition duct expanding to larger cross-sectional areas as tapered wall 206 extends from inlet 26 toward element 34. Diffuser 202 extends from inlet 26 to an inner diffuser end 208 axially spaced from upstream axial end 38 of element 34, and laterally spaced inwardly from housing wall 36. Support flange 204 extends laterally inwardly from housing wall 36 to inner diffuser end 208 to support the latter. This provides additional support for diffuser 202, such that the latter is not mounted solely as a cantilever.

Figure 17:
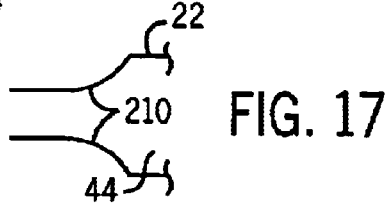
FIG. 17 is a schematic sectional view of a portion of another embodiment of an exhaust aftertreatment device in accordance with the invention.

In further embodiments, wall 60 and/or wall 88 and/or wall 112 and/or wall 206 can taper at a multi-compound angle and/or in a continuous diverging curve, for example as shown at 210, FIG. 17, to provide the respective diffuser as a hyperbolic tube to re-direct the exhaust flow along flow directions including non-axial components.

It is recognized that various equivalents, alternatives and modifications are possible within the scope of the appended claims.

What is claimed is:

1. An exhaust aftertreatment device comprising:

a housing extending axially along an axis and having an upstream inlet for receiving said exhaust, and a downstream outlet for discharging said exhaust;

an aftertreatment element in said housing for treating said exhaust;

a diffuser in said housing de-focusing centralized velocity force flow against said aftertreatment element from said inlet, wherein said diffuser comprises a central axially extending cylindrical tube and a plurality of vanes extending radially outwardly from said tube and curved to impart a non-axial flow direction component, wherein a first portion of said exhaust from said inlet flows axially within said tube, and a second portion of said exhaust from said inlet flows along said vanes and is directed by the curving of said vanes along a non-axial flow component direction.

2. The exhaust aftertreatment device according to claim 1 wherein said second portion of said exhaust is an annulus concentrically surrounding said first portion of said exhaust.

3. The exhaust aftertreatment device according to claim 2 wherein said first portion of said exhaust flows from said inlet axially through said tube to said aftertreatment element.

4. The exhaust aftertreatment device according to claim 2 wherein said tube is perforated.

5. An exhaust aftertreatment device comprising a housing extending axially along an axis and having an upstream inlet for receiving said exhaust, and a downstream outlet for discharging said exhaust, an aftertreatment clement in said housing for treating said exhaust, said housing having a chamber extending axially between said inlet and said aftertreatment element, a diffuser in said housing comprising a perforated plate extending laterally across said chamber and having a first central area and a second surrounding area, said plate being perforated at both of said first and second areas, said second area having larger perforated holes than said first area.

\* \* \* \* \*